(12) United States Patent
Wu et al.

(10) Patent No.: US 8,799,735 B2
(45) Date of Patent: *Aug. 5, 2014

(54) CHANNEL INTERLEAVER HAVING A CONSTELLATION-BASED UNIT-WISE PERMUATION MODULE

(75) Inventors: Ciou-Ping Wu, Toucheng Township, Yilan County (TW); Pei-Kai Liao, Mingjian Xiang (TW); Yu-Hao Chang, Daya Township, Taichung County (TW); Yih-Shen Chen, Hsinchu (TW)

(73) Assignee: Mediatek Inc. (TW)

( * ) Notice: Subject to any disclaimer, the term of this patent is extended or adjusted under 35 U.S.C. 154(b) by 1254 days.

This patent is subject to a terminal disclaimer.

(21) Appl. No.: 12/655,521

(22) Filed: Dec. 30, 2009

(65) Prior Publication Data

US 2010/0169722 A1      Jul. 1, 2010

Related U.S. Application Data

(60) Provisional application No. 61/141,831, filed on Dec. 31, 2008, provisional application No. 61/149,716, filed on Feb. 4, 2009, provisional application No. 61/154,027, filed on Feb. 20, 2009, provisional application No. 61/163,941, filed on Mar. 27, 2009.

(51) Int. Cl.
*G06F 11/00* (2006.01)

(52) U.S. Cl.
USPC ............................................. 714/752

(58) Field of Classification Search
USPC ......................................... 714/752
See application file for complete search history.

(56) References Cited

U.S. PATENT DOCUMENTS 7,346,827 B2 *   3/2008   Eroz et al. ...................... 714/755
7,415,079 B2 *   8/2008   Cameron et al. ............... 375/340
(Continued)

FOREIGN PATENT DOCUMENTS

CN       101218747 A      7/2008
EP       2003836 A2      12/2008
(Continued)

OTHER PUBLICATIONS

Draft Standard for Local and Metropolitan area networks—Part 16: Air Interface for Broadband Wireless Access Systems, P802.16Rev2/D7, Oct. 2008, p. 1076-1085.
International Search Report and Written Opinion of International Search Authority for PCT/CN2009/076334 dated Apr. 15, 2010 (10 pages).

(Continued)

*Primary Examiner* — Amine Riad
(74) *Attorney, Agent, or Firm* — Imperium Patent Works; Zheng Jin

(57) ABSTRACT

A channel interleaver comprises a novel constellation-based permutation module. The channel interleaver first receives a plurality of sets of encoded bits generated from an FEC encoder. The encoded bits are distributed into multiple sub-blocks and each subblock comprises a plurality of adjacent bits. A subblock interleaver interleaves each subblock and outputs a plurality of interleaved bits. The constellation-based permutation module rearranges the interleaved bits and outputs a plurality of rearranged bits. The rearranged bits are supplied to a symbol mapper such that a plurality of consecutively encoded bits in the same set of the encoded bits generated from the FEC encoder is prevented to be mapped onto the same level of bit reliability of a modulation symbol. In addition, the plurality of adjacent bits of each subblock is also prevented to be mapped onto the same level of bit reliability to achieve constellation diversity and to improve decoding performance.

34 Claims, 17 Drawing Sheets

(56) References Cited

U.S. PATENT DOCUMENTS

| | | | |
|---|---|---|---|
| 7,440,521 B2* | 10/2008 | Tran et al. | 375/341 |
| 2005/0149815 A1* | 7/2005 | Eroz et al. | 714/755 |
| 2009/0022079 A1* | 1/2009 | Zhou et al. | 370/312 |

FOREIGN PATENT DOCUMENTS

| | | |
|---|---|---|
| JP | 2005532010 | 12/2005 |
| JP | 2008522539 | 6/2006 |
| JP | 2007519361 | 7/2007 |
| JP | 2008278189 | 11/2008 |
| JP | 2009069513 | 4/2009 |
| JP | 2009116204 | 5/2009 |
| WO | WO2008058109 A2 | 5/2008 |
| WO | WO2008156335 A2 | 12/2008 |

OTHER PUBLICATIONS

EPO Search Report, for EP application 09836091, dated Jul. 18, 2012 (10 pages).

"New bit-rearrangement method to enhance HARQ performance; C80216m-08_1144", IEEE Draft; C80216M-08_1144, IEEE—SA, Piscataway, NJ. USA. vol. 802.16m, Sep. 5, 2008, pp. 1-10, XP017610971, retrieved on Sep. 6, 2008, p. 1-6.

Office Action of related U.S. Appl. No. 12/655,522 dated Sep. 25, 2012 (9 pages).

JPOA, for JP patent application 2011-542662 dated Dec. 18, 2012 (8 pages).

SIPO, the Examination Report of the Chinese patent application 200980100885X dated Feb. 5, 2013 (8 pages).

* cited by examiner

BLER–SNR COMPARISON
(64 QAM CODE RATE = 1/3, NEP = 960

CHANNEL INTERLEAVER HAVING A CONSTELLATION-BASED UNIT-WISE PERMUATION MODULE

CROSS REFERENCE TO RELATED APPLICATIONS

This application claims priority under 35 U.S.C. §119 from U.S. Provisional Application No. 61/141,831, entitled "Interleaver Design for Error Correction Code," filed on Dec. 31, 2008, U.S. Provisional Application No. 61/149,716, entitled "Bit Grouping Design for Error Correction Code," filed on Feb. 4, 2009, U.S. Provisional Application No. 61/154,027, entitled "Bit Grouping Design for Error Correction Code," filed on Feb. 20, 2009, U.S. Provisional Application No. 61/163,941, entitled "Bit Grouping Design for Error Correction Code," filed on Mar. 27, 2009, the subject matter of which is incorporated herein by reference.

TECHNICAL FIELD

The disclosed embodiments relate generally to interleaver design for error correction code, and, more particularly, to constellation-based permutation for channel interleaving.

BACKGROUND

Most of error correction codes (ECCs) are designed to correct random channel errors. The decoder performance usually suffers from burst channel errors with long runs. Channel interleaving is employed to average the burst channel errors to improve performance. At the transmitter side, channel interleaving scrambles encoded bits such that the effect of a long channel fading is distributed over an entire coding block and thus the run length of each burst channel error in one coding block is largely recued at the receiver side.

FIG. 1 (Prior Art) is a block diagram of an interleaving scheme for channel encoding adopted in IEEE 802.16e wireless systems. In IEEE 802.16e wireless systems, convolutional turbo code (CTC) interleaver is used for channel encoding. As illustrated in FIG. 1, CTC interleaver 11 comprises a bit separation module 12, a subblock interleaver 13, and a bit-grouping module 14. Bit separation module 12 receives all encoded bits from CTC encoder and distributes the encoded bits into several information subblocks A and B, and several parity subblocks Y1, Y2, W1 and W2. Subblock interleaver 13 interleaves all subblocks independently. Bit-grouping module 14 multiplexes the interleaved subblocks and regroups them into subblocks A, B, Y and W.

In IEEE 802.16e, the entire subblock of bits to be interleaved is written into an array at addresses from 0 to the number of bits minus one (N−1), and the interleaved bits are read out in a permuted order with the i-th bit being read from address $AD_i$ (i=0 . . . N−1). The formula of subblock interleaver 13 is given as follows:

$$T_k = 2^m (k \bmod J) + BRO_m(\lfloor k/J \rfloor) \quad (1)$$

where $T_k$ is a tentative output address, m and J are subblock interleaver parameters, $BRO_m(y)$ indicates the bit-reversed m-bit value of y (i.e., $BRO_3(6)=3$). If $T_k$ is less than N, then $AD_i = T_k$ and increment i and k by 1; otherwise discard $T_k$ and increment k only. The above subblock interleaving procedure is repeated until all N interleaver output addresses are obtained.

The interleaved bits are then modulated and transmitted at the transmitter side. At the receiver side, the received bits are de-modulated, de-interleaved, and then decoded by a CTC decoder. In high-order modulation schemes (e.g., 16QAM and 64QAM where modulation symbols carry more than two bits), different bits have different error probabilities because there are multiple level of bit reliabilities in one modulation symbol. As a result, two problems arise using the IEEE 802.16e CTC interleaving scheme with high-order modulation. First, based on the subblock interleaving equation (1), adjacent encoded bits in each subblock are mapped onto the same bit reliability. This problem is also referred to as intra-block continuity as depicted in FIG. 1, where adjacent encoded bits 0, 1, 2 in subblock A are all mapped to high bit reliability H. Second, because each subblock is interleaved based on the same interleaving equation, multiple bits with the same index in different subblocks may be mapped onto the same bit level. This problem is also referred to as inter-block continuity as depicted in FIG. 1, where the same bits 93 in different subblocks A and B are all mapped to low bit reliability L.

FIG. 2 (Prior Art) illustrates intra-block continuity problem with more detail. FIG. 2 comprises a diagram of subblock A after subblock interleaving and a 16QAM constellation map 21. The interleaved subblock A is supplied to a symbol mapper using a selected modulation scheme. Under 16QAM modulation scheme, each modulation symbol carries four bits b0b1b2b3, with b0 and b2 have high bit reliability H, and b1 and b3 have low bit reliability L. As illustrated in FIG. 2, based on the subblock interleaving equation (1), adjacent bits in subblock A are all mapped onto the same bit reliability. For example, bits 0-31, 96-160 are mapped to H, and bits 32-95, 161-191 are mapped to L.

FIG. 3 (Prior Art) illustrates inter-block continuity problem with more detail. FIG. 3 comprises a CTC encoder 31 and a 64QAM constellation map 32. CTC Encoder 31 takes a pair of input bits A and B and generates a set of encoded bits A, B, Y1, W1, Y2, and W2 on a set-by-set basis. Each set of the encoded bits are interleaved and then supplied to a symbol mapper using a selected modulation scheme. In 64QAM, each modulation symbol carries six bits b0b1b2b3b4b5, with b0 and b3 have high bit reliability H, b1 and b4 have medium reliability M, and b2 and b5 have low bit reliability L. As illustrated in FIG. 3, because all subblocks are interleaved based on the same interleaving equation, the same set of encoded bits are mapped onto the same bit reliability. For example, the same bits 93 in both subblocks A and B are mapped to L.

Because of the intra-block and inter-block continuity problems, the IEEE 802.16e channel interleaver induces burst errors and consequently its decoder performance suffers. It is thus desirable to prevent mapping adjacent encoded bits within each subblock onto the same level of bit reliability, and also desirable to prevent mapping multiple encoded bits with the same index in different subblocks onto the same level of bit reliability.

SUMMARY

A channel interleaver comprises a novel constellation-based permutation module. The channel interleaver first receives a plurality of sets of encoded bits generated from an FEC encoder. The encoded bits are distributed into multiple subblocks and each subblock comprises a plurality of adjacent bits. A subblock interleaver interleaves each subblock and outputs a plurality of interleaved bits. The constellation-based permutation module rearranges the interleaved bits and outputs a plurality of rearranged bits. The rearranged bits are supplied to a symbol mapper such that a plurality of consecutively encoded bits in the same set of the encoded bits generated from the FEC encoder prevented to be mapped onto the same level of bit reliability of a modulation symbol. In addition, the plurality of adjacent bits of each subblock is also prevented to be mapped onto the same level of bit reliability to achieve constellation diversity and to improve decoding performance at the receiver side.

In one embodiment, the constellation-based permutation module performs block-wise scrambling on the interleaved bits. In one example, the constellation-based permutation module scrambles the interleaved bits by circularly shifting a selected number of bits for a selected number of subblocks. In another example, the constellation-based permutation module scrambles the interleaved bits by swapping a selected number of bits for a selected number of subblocks.

In another embodiment, the constellation-based permutation module performs unit-wise scrambling on the interleaved bits. In one example, the constellation-based permutation module first partitions each of the subblocks into multiple units, and then scrambles the interleaved bits by circularly shifting a selected number of bits for a selected number of units of each subblock. In another example, the constellation-based permutation module first partitions each of the subblocks into multiple units, and then scrambles the interleaved bits by swapping a selected number of bits for a selected number of units of each subblock.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 4:
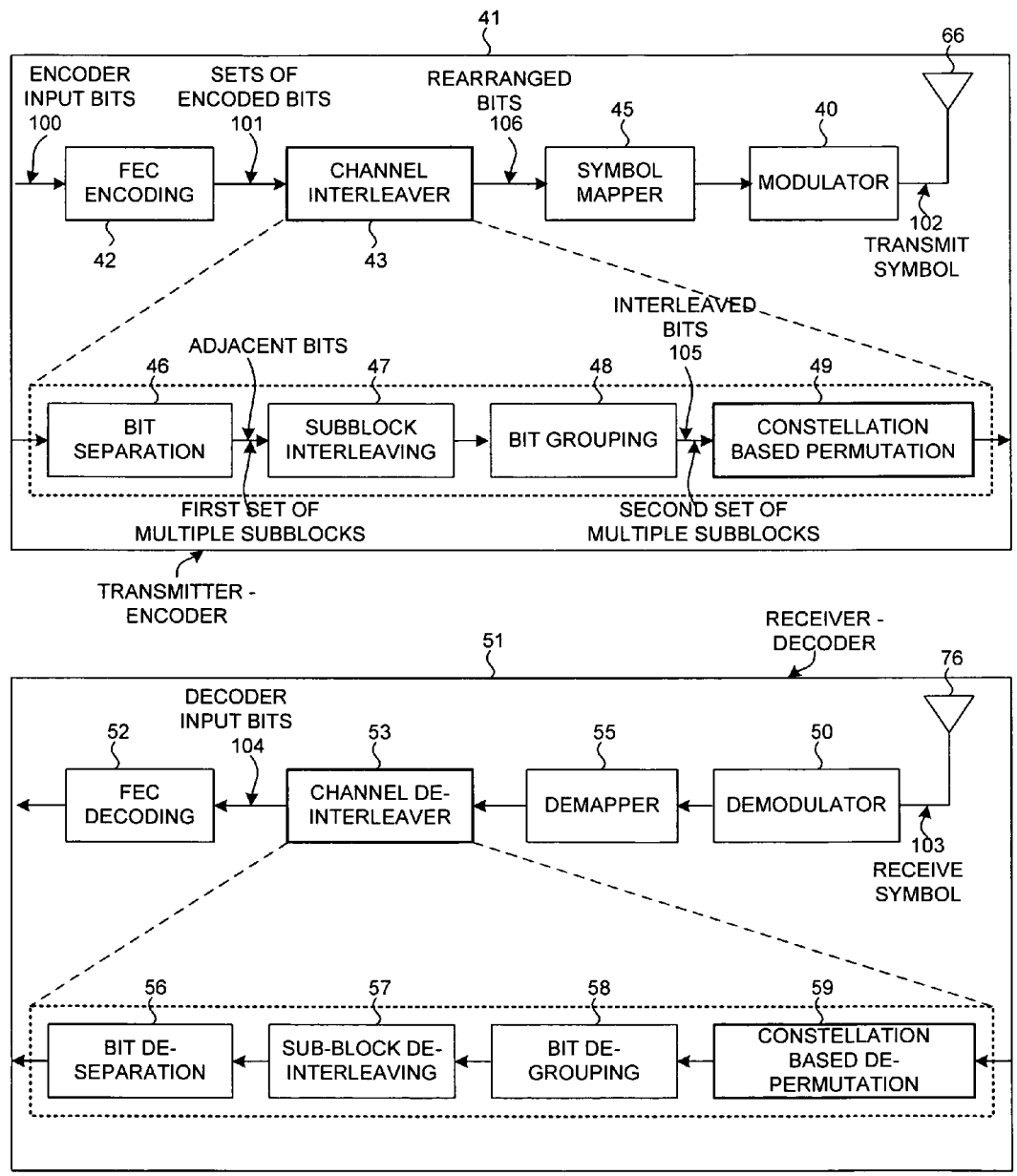
FIG. 4 is a block diagram of a transmitter-encoder and a receiver-decoder in accordance with one novel aspect.

FIG. 4 is a block diagram of a transmitter-encoder 41 and a receiver-decoder 51 in accordance with one novel aspect. Transmitter-encoder 41 comprises a forward error correction (FEC) encoder 42, a channel interleaver 43, a symbol mapper 45, a modulation module 40, and a transmitting antenna 66. Channel interleaver 43 further comprises a bit separation module 46, a subblock interleaver 47, a bit-grouping module 48, and a constellation-based permutation module 49. Similarly, receiver-decoder 51 comprises a FEC decoder 52, a channel de-interleaver 53, a symbol de-mapper 55, a demodulation module 50, and a receiving antenna 76. Channel de-interleaver 53 further comprises a bit de-separation module 56, a subblock de-interleaver 57, a bit de-grouping module 58, and a constellation-based de-permutation module 59. At the transmitter side, a plurality of sets of encoded bits 101 from FEC encoder 42 are interleaved, mapped and modulated into transmission symbol 102 and then transmitted by antenna 66. At the receiver side, receive symbols 103 received by antenna 76 are de-modulated, de-mapped and then de-interleaved into decoder input bits 104 to be decoded by FEC decoder 52.

In one novel aspect, channel interleaver 43 comprises constellation-based permutation module 49 to achieve constellation diversity for improved decoder performance against burst channel errors. Bit separation module 46 receives a plurality of sets of encoded bits 101 from FEC encoder and distributes them into a first set of information subblocks and parity subblocks. Subblock interleaver 47 interleaves each subblock independently. In one embodiment, bit-grouping module 48 multiplexes the interleaved bits and regroups then into a second set of subblocks and outputs as interleaved bits 105. The number of the first set of multiple subblocks is not necessary the same as the number of the second set of multiple subblocks, which are generated after regrouping. The number of the second set of multiple subblocks can be the different as the first set of multiple subblocks in accordance with different system design and implementation considerations. In another embodiment (shown in FIG. 13B), subblock interleaver 47 interleaves each subblock and outputs interleaved bits 105 directly. Constellation-based permutation module 49 partitions (optional) and scrambles interleaved bits 105 into rearranged bits 106. By scrambling the interleaved bits 105, a plurality of consecutively encoded bits within each set of the encoded bits 101 is prevented to be mapped onto the same level of bit reliability of a modulation symbol via symbol mapper 45. In addition, by partitioning and then scrambling the interleaved bits 105, the plurality of adjacent bits within a subblock is also prevented to be mapped onto the same level of bit reliability of a modulation symbol. Therefore, such constellation-based permutation achieves constellation diversity and improves decoder performance at the receiver side.

There are two basic types of constellation-based permutation, one is referred to as block-wise scrambling, and the other is referred to as unit-wise scrambling. Each of the constellation-based permutation types is now described below with more details.

Block-Wise Scrambling

Figure 1:
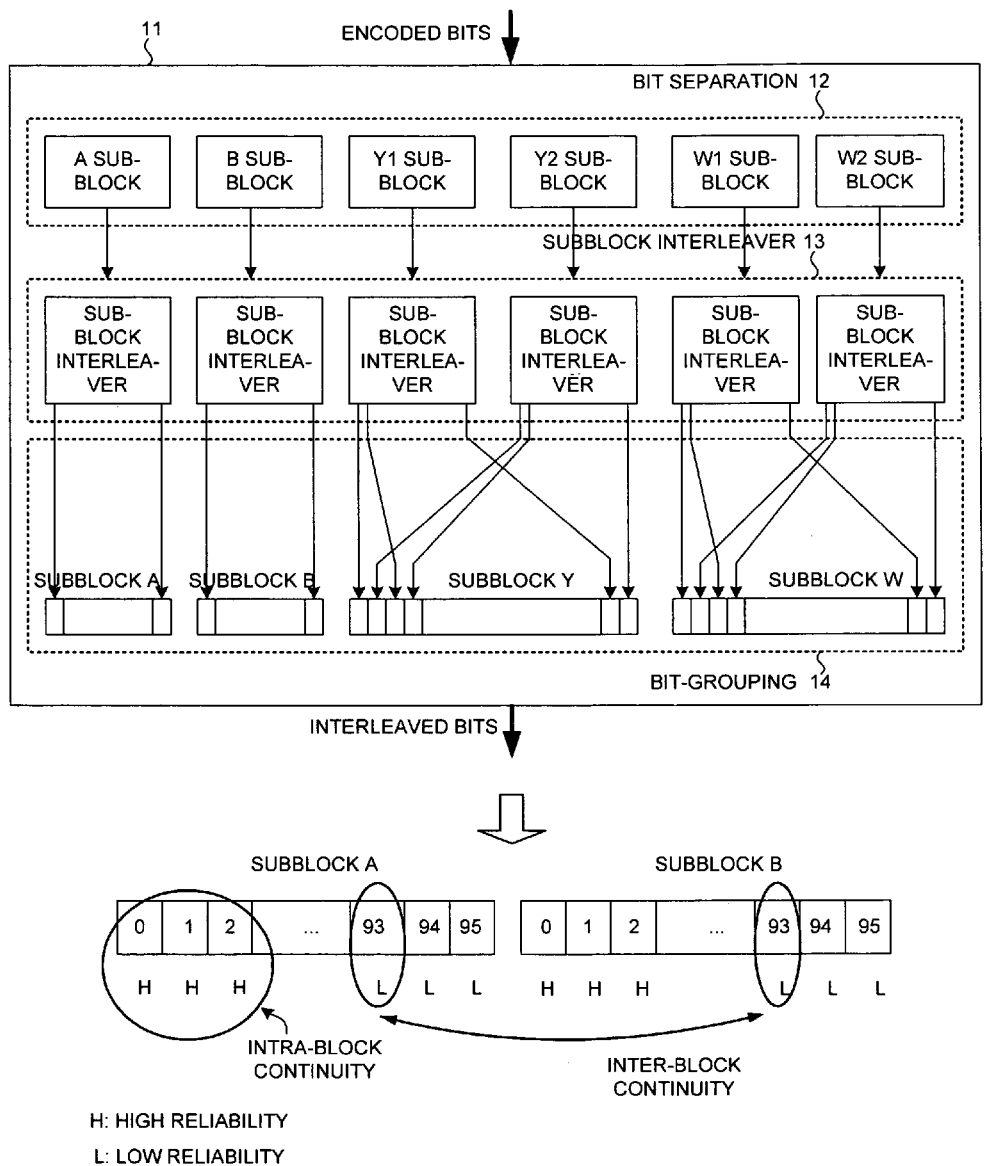
FIG. 1 (Prior Art) is a block diagram of interleaving scheme for channel encoding adopted in IEEE 802.16e wireless systems.
Figure 5A:
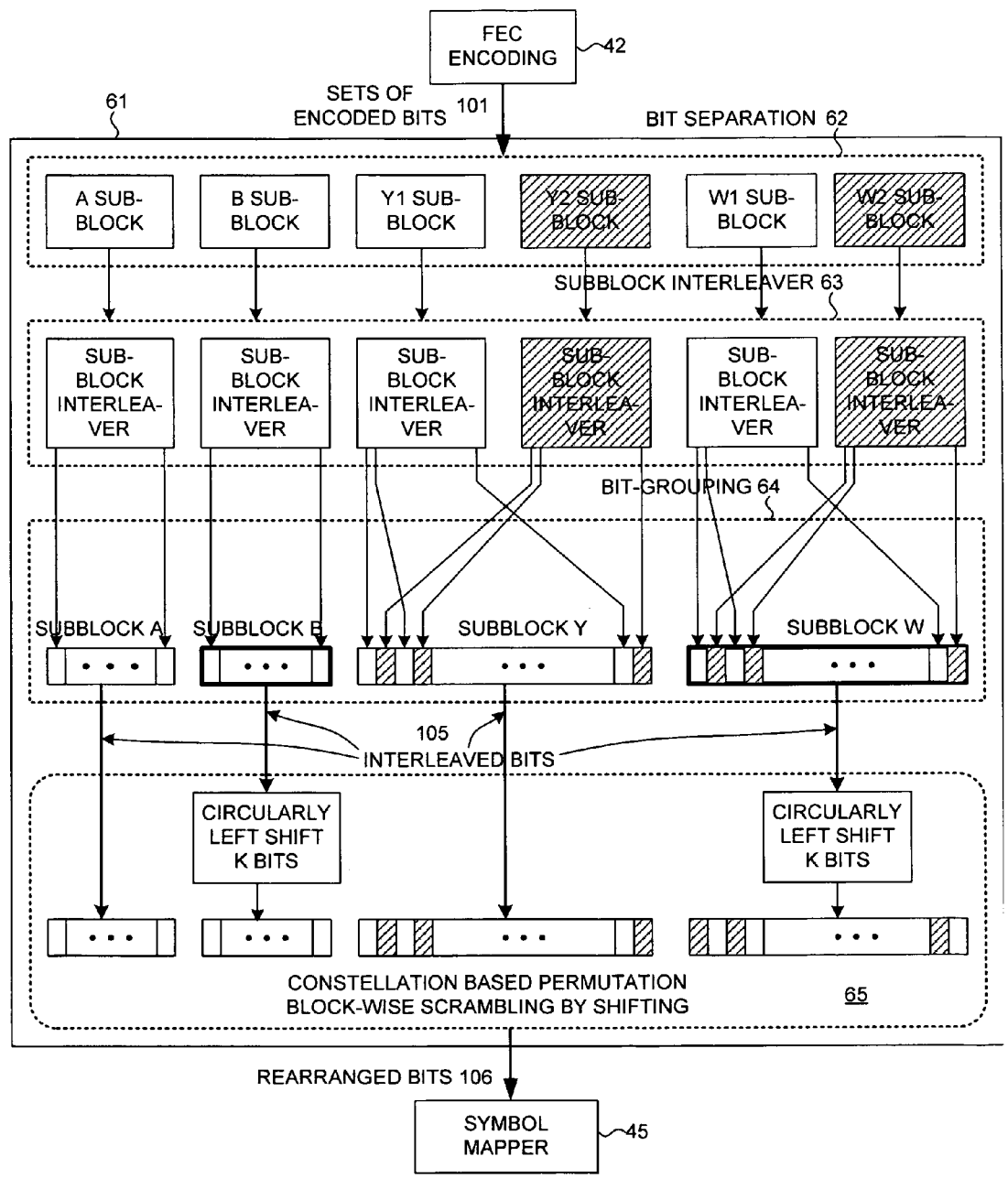
FIG. 5A is a block diagram that illustrates a first embodiment of a channel interleaver of FIG. 4.

FIG. 5A is a block diagram of a channel interleaver 61 that illustrates a first embodiment of channel interleaver 43 of FIG. 4. In the example of FIG. 5A, channel interleaver 61 is designed based on IEEE 802.16e channel interleaver 11 of FIG. 1 that is illustrated in the background section. Channel interleaver 61 comprises a bit separation module 62, a sub-block interleaver 63, and a bit-grouping module 64. In addition, channel interleaver 61 comprises a novel constellation-based permutation module 65.

Figure 5B:
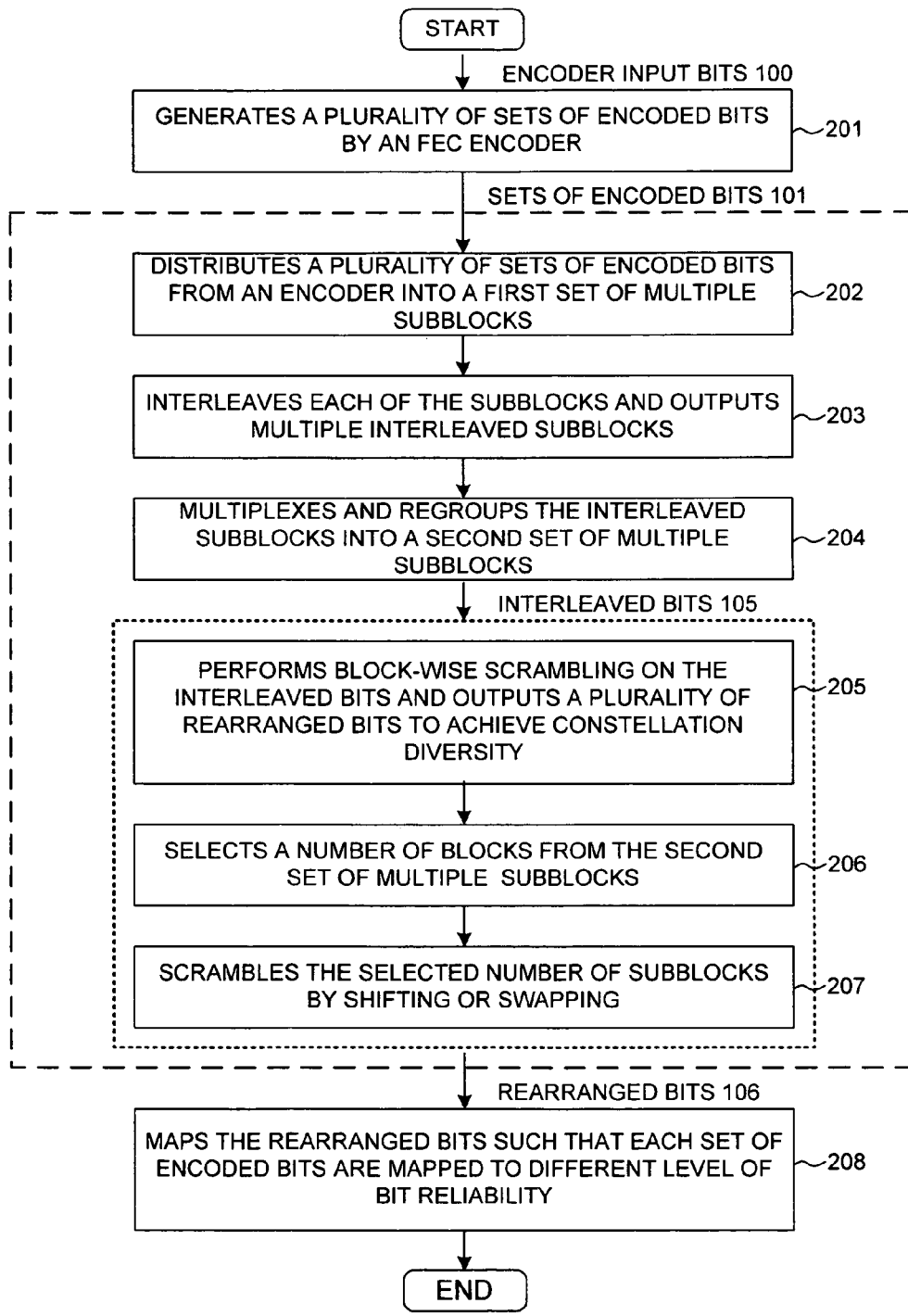
FIG. 5B is a flow chart of channel interleaving with block-wise scrambling scheme performed by a channel interleaver.

FIG. 5B is a flow chart of channel interleaving with block-wise scrambling scheme performed by channel interleaver 61 of FIG. 5A. First, FEC encoder 42 generates a plurality of sets of encoded bits 101 (step 201). In IEEE 802.16e, a convolutional turbo code (CTC) encoder is adopted as FEC encoder 42. Under CTC encoding, every two inputs bits are encoded to generate six encoded bits (i.e., two informational bits A, B and four parity bits Y1, Y2, W1, and W2). Thus, encoder input bits 100 are supplied to CTC encoder 42 every two bits at a time, and a plurality of sets of encoded bits 101 are consecutively encoded and generated by CTC encoder 42 every six bits at a time, with every six bits form a set of encoded bits. Next, the plurality of sets of encoded bits 101 is distributed by bit separation module 62 into six subblocks (i.e., a first set of multiple subblocks) (step 202). The six subblocks include two informational subblocks A and B, and four parity subblocks Y1, Y2, W1 and W2. Each of the six subblocks is then interleaved independently by subblock interleaver 63 (step 203). The formula of subblock interleaver 63 is given by the subblock interleaving equation (1) described in the background section. Bit-grouping module 64 further multiplexes and regroups each of the interleaved subblocks into a second set of multiple subblocks, where information subblocks A and B remain the same, parity subblocks Y1 and Y2 are multiplexed and regrouped into subblock Y, and parity subblocks W1 and W2 are multiplexed and regrouped into subblock W (step 204). After multiplexing and regrouping each interleaved subblock into a plurality of interleaved bits 105, interleaved bits 105 are finally block-wise scrambled by constellation-based permutation module 65 (step 205). After scrambling, rearranged bits 106 are mapped by symbol mapper 45 such that all six bits within each set of encoded bits 101 are mapped onto different levels of reliability of a modulation symbol before transmission (step 208).

In the example of FIG. 5A, constellation-based permutation module 65 performs block-wise scrambling by circularly shifting a selected number of bits for a selected number of subblocks. First, a number of subblocks out of the four subblocks A, B, Y and W are selected (i.e., step 206 of FIG. 5B). The number of subblocks selected is determined based on modulation order, FEC block size (Nep), and encoding scheme. In this particular example, information subblock B and parity subblock W are selected. Next, each of the selected subblocks is circularly left-shifted by a number of bits (i.e., step 207 of FIG. 5B). The number of bits to be shifted for each subblock is determined such that each set of encoded bits 101 generated by FEC encoder 42 are mapped onto different levels of bit reliability of a modulation symbol. In this particular example, subblock B and subblock W are shifted by k bits, where k is set to integer one when the FEC block size Nep is equal to multiple of the modulation order, and otherwise k is set to zero. In the example of 64QAM where modulation order is six, k is set to one if Nep is equal to multiple of six, and k is set to zero if otherwise. By circularly left-shifting a selected number of bits for a selected number of subblocks, constellation diversity is achieved to improve decoder performance at the receiver side.

Figure 6A:
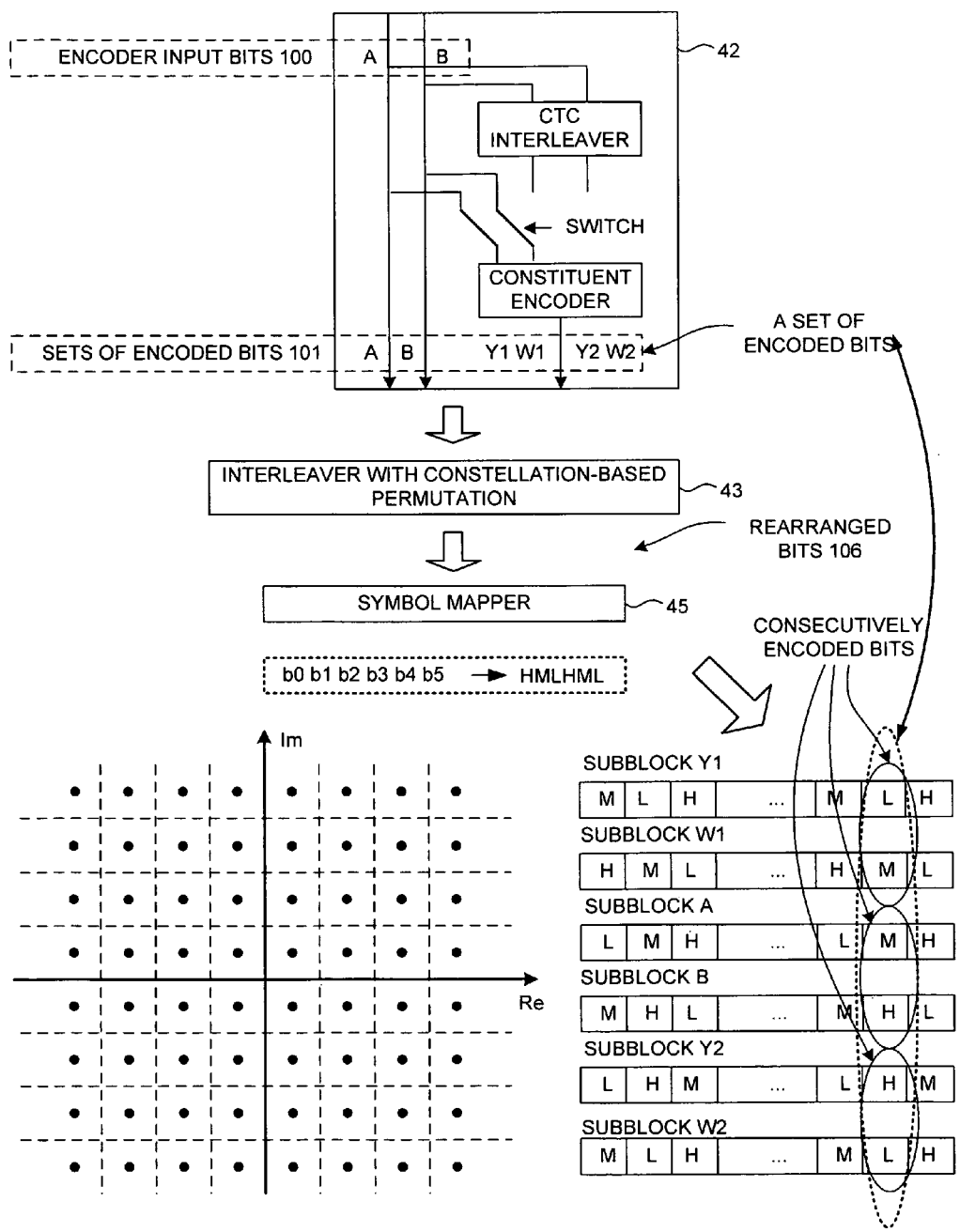
FIG. 6A illustrates how constellation diversity is achieved for each set of encoded bits at transmit side through a constellation-based permutation module.

FIG. 6A illustrates how constellation diversity is achieved through constellation-based permutation. FIG. 6A comprises simplified diagrams of a CTC encoder 42, a channel interleaver with constellation-based permutation 43, and a symbol mapper 45. CTC encoder 42 generates a plurality of sets of encoded bits 101 from encoder input bits 100 on a set-by-set basis. As illustrated in FIG. 6A, encoder inputs bits A and B are supplied to CTC encoder 42 every two bits at a time, and every two encoder bits are encoded to output one set of six encoded bits A, B, Y1, Y2, W1 and W2 every six bits at a time. For example, a first bit of input A and a first bit of input B are supplied to CTC encoder 42 at one time instance. After CTC encoding, a first set of encoded bits are consecutively encoded and generated at another time instance, and the first set of encoded bits includes a first bit of A, B, Y1, Y2, W1, and W2 respectively. In other words, the $n^{th}$ bit of A, B, Y1, Y2, W1 and W2 are generated to form the $n^{th}$ set of encoded bits at a corresponding time instance. The plurality of sets of encoded bits are distributed, interleaved and scrambled into rearranged bits 106 by channel interleaver 43. Rearranged bits 106 are mapped onto modulation symbols by symbol mapper 45. In the example of FIG. 6A, 64QAM modulation scheme is used. Each modulation symbol carries six bits b0b1b2b3b4b5, with b0 and b3 have high bit reliability H, b1 and b4 have medium reliability M, and b2 and b5 have low bit reliability L.

In one specific example of FIG. 6A, one set of encoded bits of "Y1, W1, A, B, Y2 and W2" are generated from CTC encoder 43, each of the six bits are mapped to "L, M, M, H, H, L" respectively. Therefore, all three levels of bit reliability L, M, and H of a 64QAM modulation symbol are being mapped, with every two bits being mapped to one level of bit reliability. In addition, two information bits and four parity bits are also mapped to different levels of bit reliability to achieve constellation diversity. In some other examples, the six encoded bits within the same set are not always mapped to all different levels of bit reliability of a modulation symbol. However, by circularly left-shifting a selected number of bits for a selected number of subblocks, at least some of the consecutively encoded bits in the same set of the encoded bits are not mapped onto the same level of bit reliability of the modulation symbol.

Figure 3:
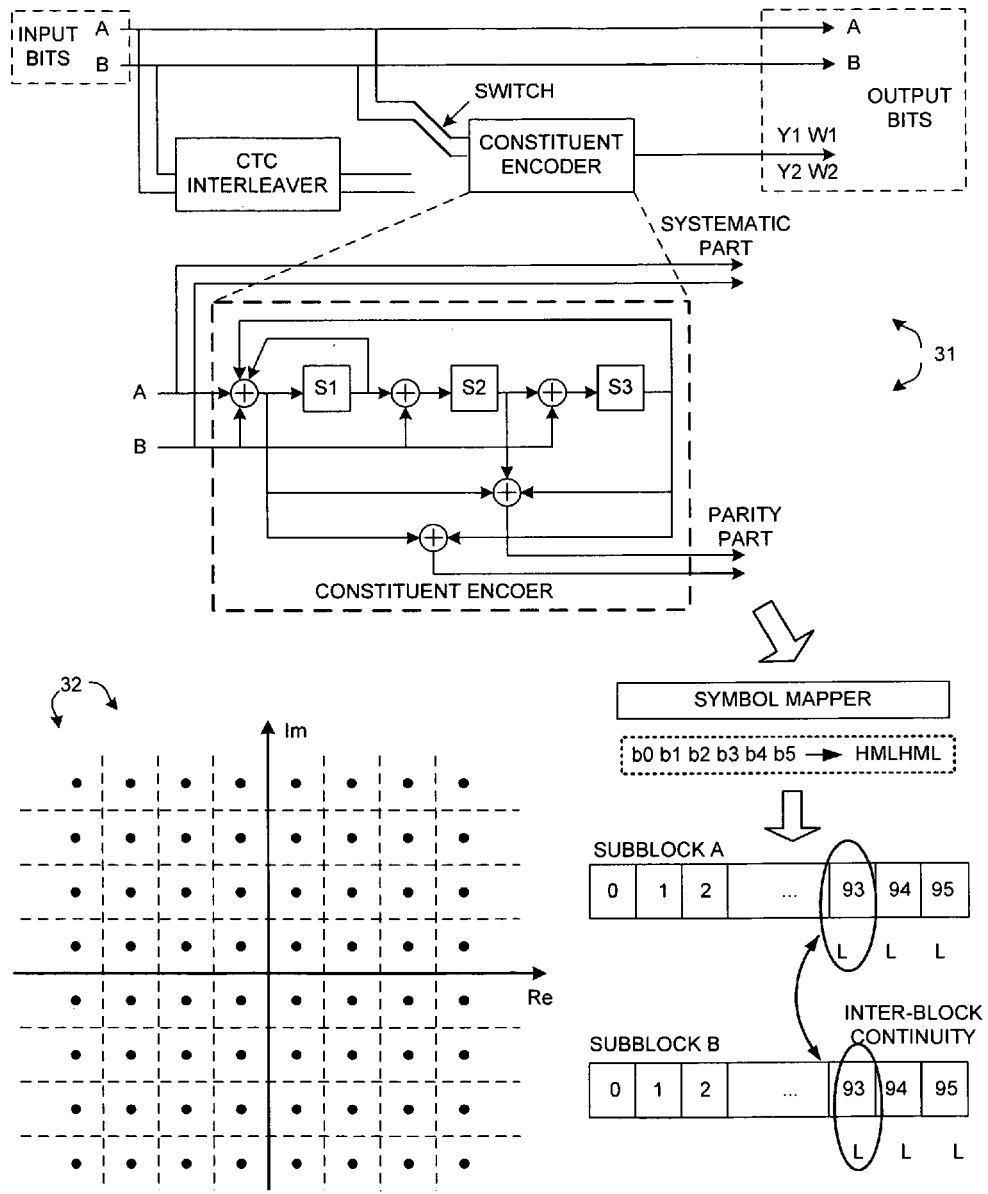
FIG. 3 (Prior Art) illustrates a CTC encoder and a 64QAM constellation map.

As illustrated in the background section with respect to FIG. 3, because all subblocks are interleaved based on the same interleaving equation, the consecutively encoded bits are mapped onto the same bit reliability. This is a problem being referred to as inter-block continuity. In the example of FIG. 6A, however, subblocks B, W1 and W2 have been left-shifted by k bit, and k is equal to integer one when Nep is equal to multiple of modulation order. For example, k=1 when Nep=576 or 1960, and modulation order=6 for 64QAM. Thus, but circularly shifting a selected number of bits for a selected number of subblocks, the problem of inter-block continuity is avoided, consecutively encoded bits within the same set of encoded bits are mapped onto different levels of bit reliability of a modulation symbol to achieve constellation diversity.

Figure 6B:
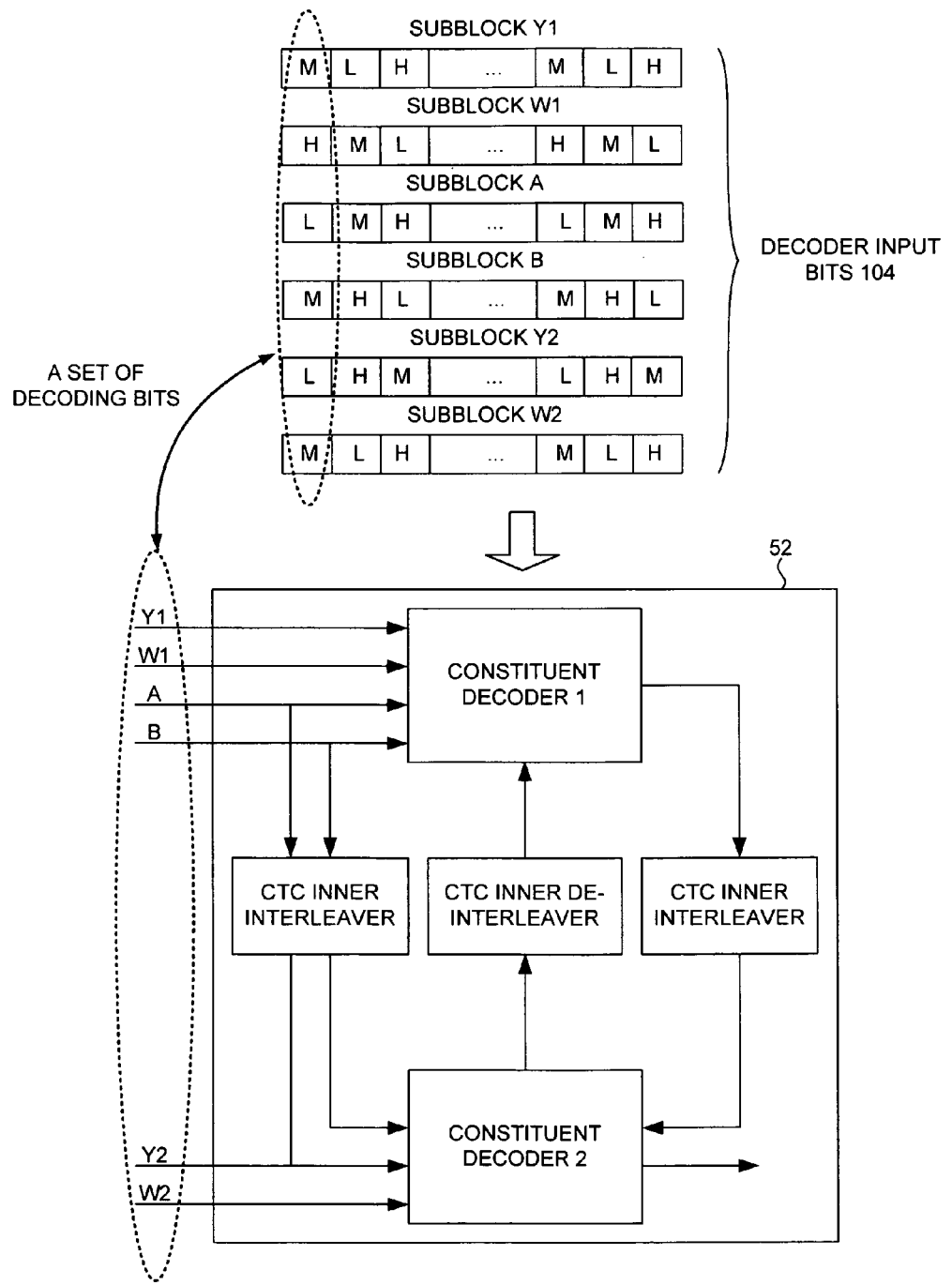
FIG. 6B illustrates how decoding performance is improved at receive side because of constellation diversity.

FIG. 6B illustrates how decoding performance at the receiver side because of constellation diversity. FIG. 6B comprises a diagram of decoder input bits 104 and an FEC decoder 52. As illustrated in FIG. 6B, the decoder input bits 104 contains a plurality of set of decoding bits; each set of the decoding bits is equivalent to each set of the encoded bits after the entire process of interleaving, mapping, modulation at the transmit side and the entire process of demodulation, demapping, and de-interleaving at the receiver side. Each set of the decoding bits are supplied to FEC decoder 52 and decoded on a set-by-set basis. Because each set of the decoding bits has constellation diversity just like each set of the encoded bits, decoding performance at the receiver side is thus improved with reduced run length of channel burst error.

Figure 7:
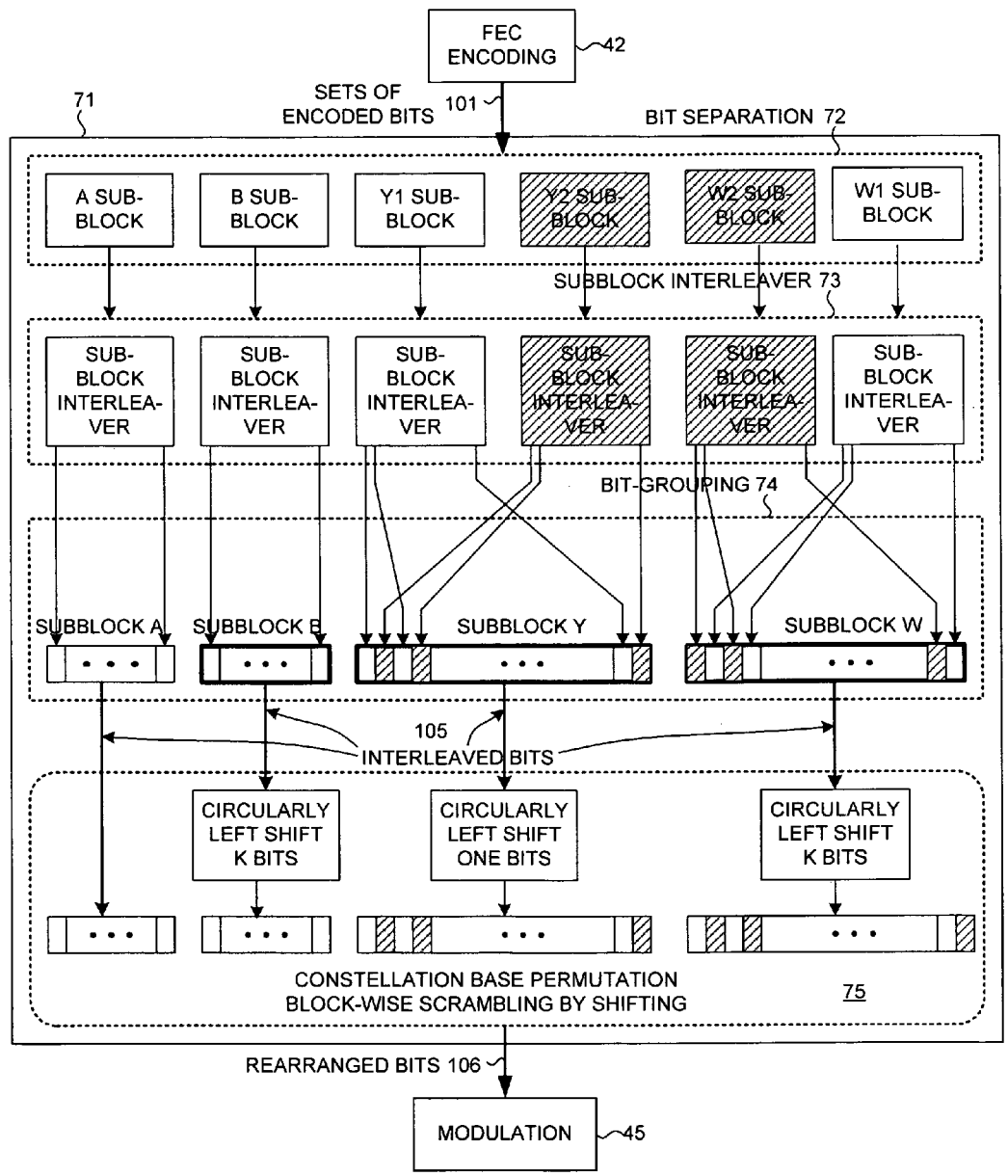
FIG. 7 is a block diagram that illustrates a second embodiment of a channel interleaver of FIG. 4.

FIG. 7 is a block diagram of a channel interleaver 71 that illustrates a second embodiment of channel interleaver 43 of FIG. 4. Channel interleaver 71 comprises a bit separation module 72, a subblock interleaver 73, a bit-grouping module 74, and a constellation-based permutation module 75. Channel interleaver 71 is very similar as compared to channel interleaver 61 of FIG. 5A. However, the order of subblocks W1 and W2 is reversed before being supplied to bit-grouping module 74. As a result, constellation-based permutation module 75 selects three subblocks B, Y, and W instead of two subblocks B and W to perform scrambling by shifting. Subblock Y is circularly left-shifted by one bit, while subblocks B and W are circularly left-shifted by k bit, where k is set to integer one when the FEC block size Nep is equal to multiple of the modulation order, and otherwise k is set to zero. Although the order of subblocks W1 and W2 are reversed, the same desired constellation diversity can be achieved for each set of encoded bits by shifting a selected number of bits on a selected number of subblocks.

Figure 8:
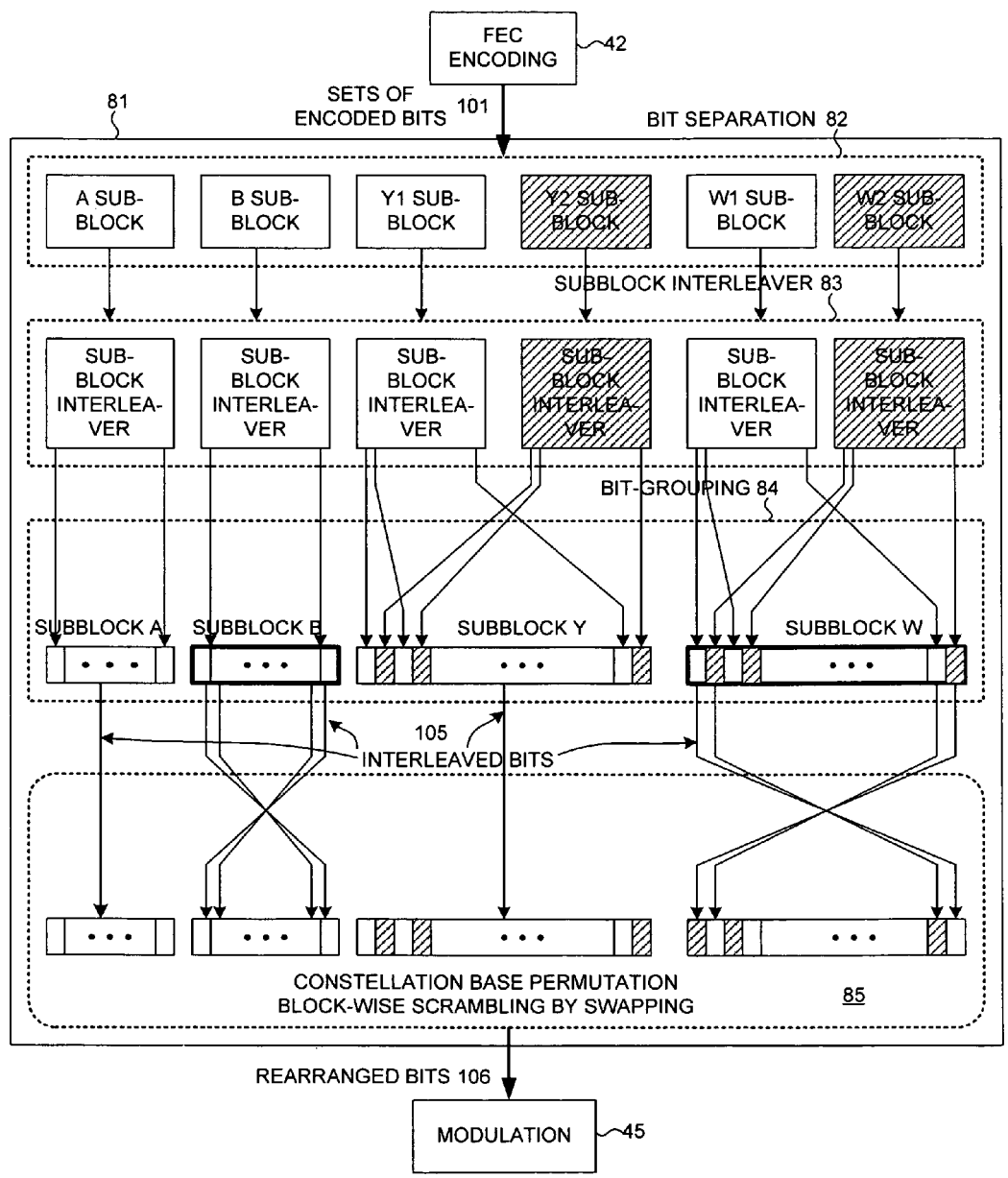
FIG. 8 is a block diagram that illustrates a third embodiment of a channel interleaver of FIG. 4.

FIG. 8 is a block diagram of a channel interleaver 81 that illustrates a third embodiment of channel interleaver 43 of FIG. 4. Channel interleaver 81 comprises a bit separation module 82, a subblock interleaver 83, a bit-grouping module 84, and a constellation-based permutation module 85. Channel interleaver 81 is also very similar as compared to channel interleaver 61 of FIG. 5A. However, constellation-based permutation module 85 performs block-wise scrambling by swapping instead of shifting. First, a number of subblocks out of the four subblocks A, B, Y, and W are selected. The selected number of subblocks is determined based on modulation order, FEC block size (Nep), and encoding scheme. In this particular example, information subblock B and parity subblock W are selected. Next, each of the selected subblocks is block-wise swapped. Block-wise swapping involves swapping the i-th bit and the (N−i+1)-th bit of a selected subblock having N bits, wherein i is a running index from one to N/2. By swapping a selected number of subblocks, constellation diversity is achieved for each set of encoded bits generated by the FEC encoder to improve decoding performance.

Unit-Wise Scrambling

Figure 9A:
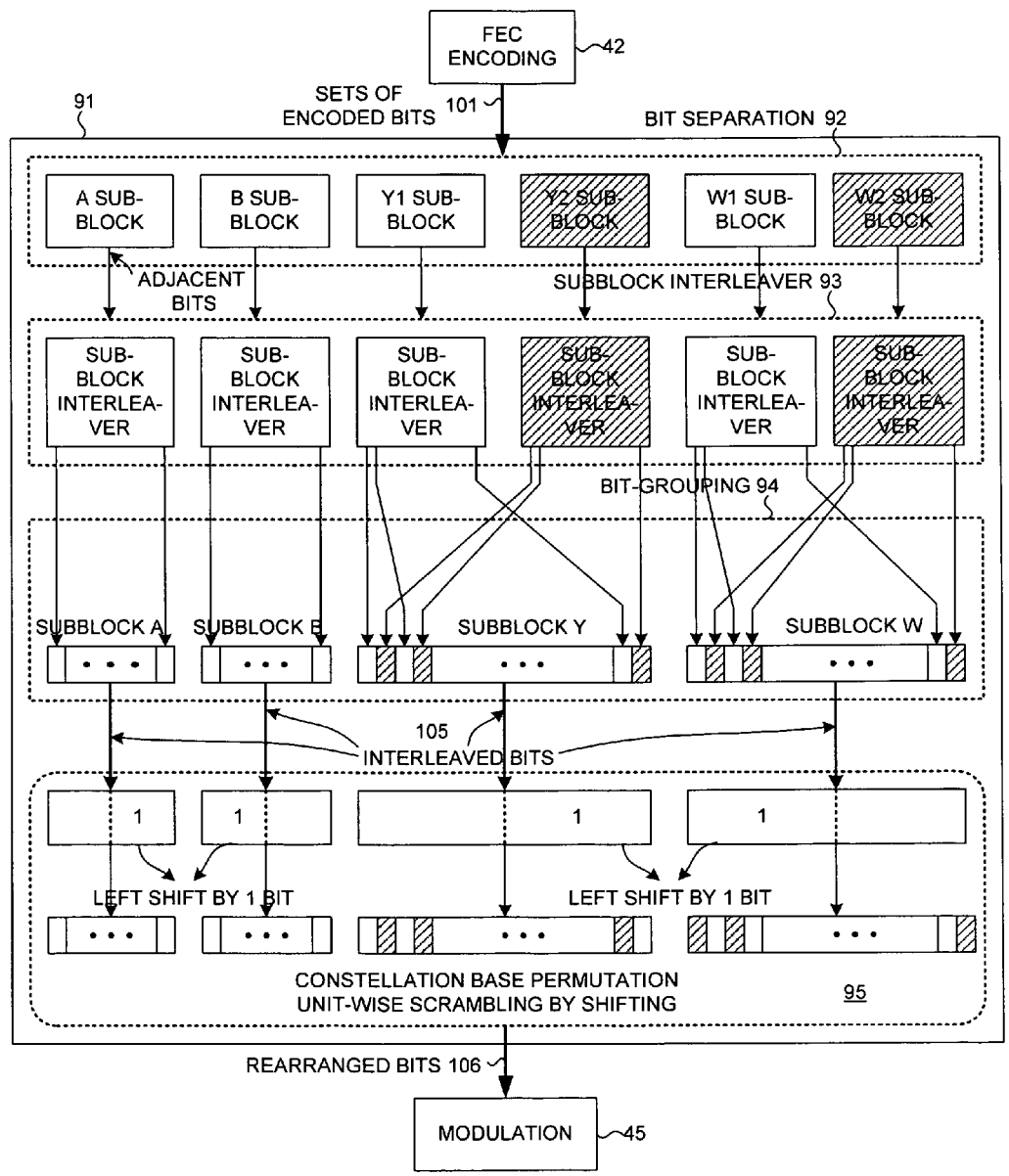
FIG. 9A is a block diagram that illustrates a fourth embodiment of a channel interleaver of FIG. 4.

In addition to block-wise scrambling, unit-wise scrambling is another constellation-based permutation scheme that is used in a channel interleaver to achieve constellation diversity and to improve decoder performance. FIG. 9A is a block diagram of a channel interleaver 91 that illustrates a fourth embodiment of channel interleaver 43 of FIG. 4. Channel interleaver 91 comprises a bit separation module 92, a subblock interleaver 93, a bit-grouping module 94, and a constellation-based permutation module 95. Instead of performing block-wise scrambling, constellation-based permutation module 95 performs unit-wise scrambling on interleaved bits 105 and outputs a plurality of rearranged bits 106.

Figure 9B:
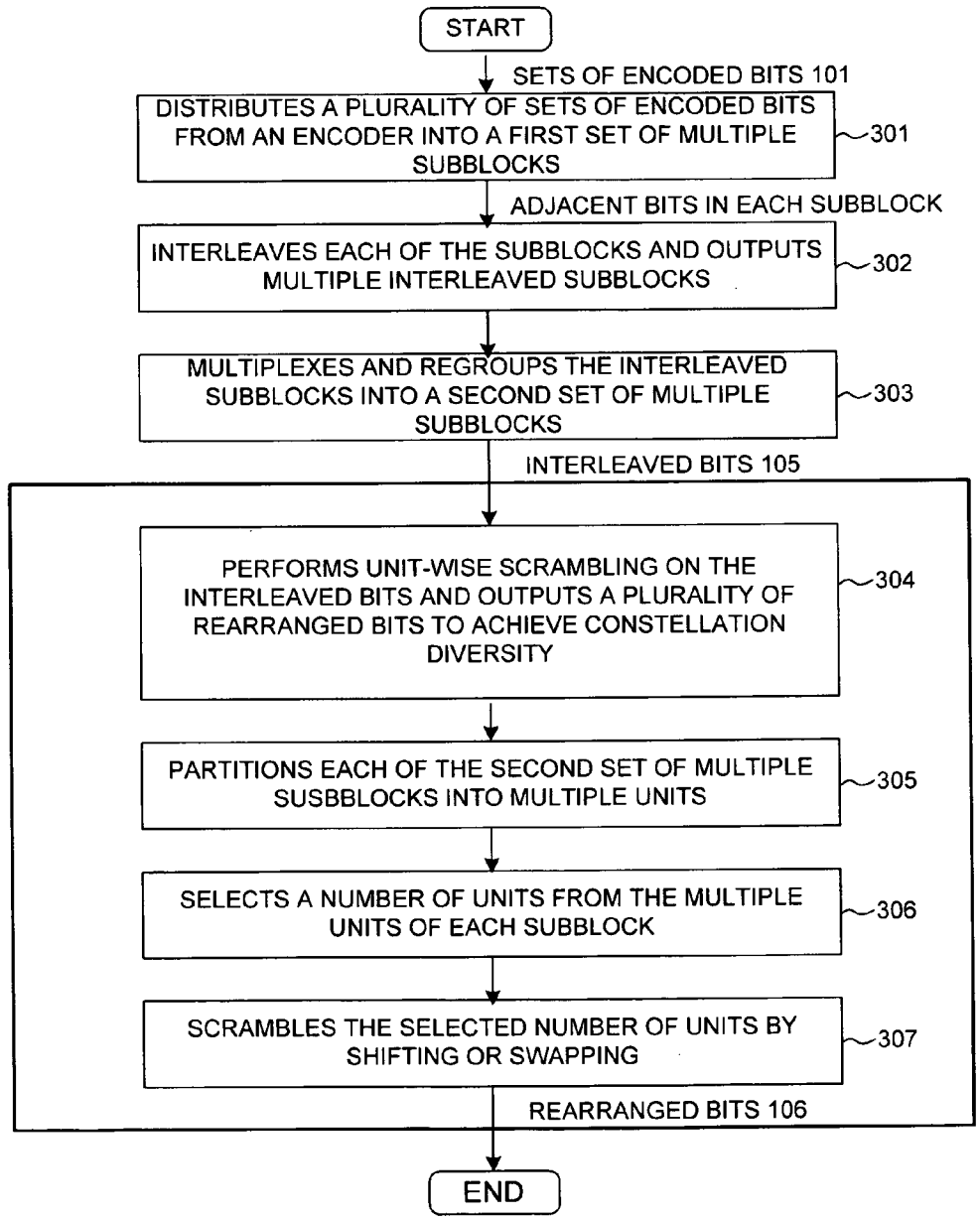
FIG. 9B is a flow chart of channel interleaving with unit-wise scrambling scheme performed by a channel interleaver.

FIG. 9B is a flow chart of channel interleaving with unit-wise scrambling scheme performed by channel interleaver 91 of FIG. 9A. First, a plurality of sets of encoded bits 101 from an FEC encoder is distributed by bit separation module 92 into six subblocks (i.e., a first set of multiple subblocks) (step 301). The six subblocks include two informational subblocks A and B, and four parity subblocks Y1, Y2, W1 and W2. Each of the six subblocks include a plurality of adjacent bits within each subblock. Each of the six subblocks is then interleaved independently by subblock interleaver 93 (step 302). Bit-grouping module 94 further multiplexes and regroups each of the interleaved subblocks into a second set of multiple subblocks, where information subblocks A and B remain the same, parity subblocks Y1 and Y2 are multiplexed and regrouped into subblock Y, and parity subblocks W1 and W2 are multiplexed and regrouped into subblock W (step 303). After multiplexing and regrouping each interleaved subblock into a plurality of interleaved bits 105, interleaved bits 105 are finally unit-wise scrambled by constellation-based permutation module 95 to generate rearranged bits 106 to achieve constellation diversity (step 304).

Unit-wise scrambling further comprises several steps. First, each subblock is partitioned into multiple units (step 305). Next, a number of units are selected from each subblock (step 306). Finally, the selected units are scrambled by either shifting or swapping (step 307). In the example of FIG. 9A, each subblock is partitioned into two units, a first and a second unit. For subblock A and Y, the second unit is selected for scrambling, and for subblocks B and W, the first unit is selected for scrambling. Each of the selected unit is then circularly left-shifted by one bit. In one novel aspect, by unit-wise scrambling for a selected number of units on each subblock, constellation diversity is achieved to improve decoder performance at the receiver side.

Figure 10:
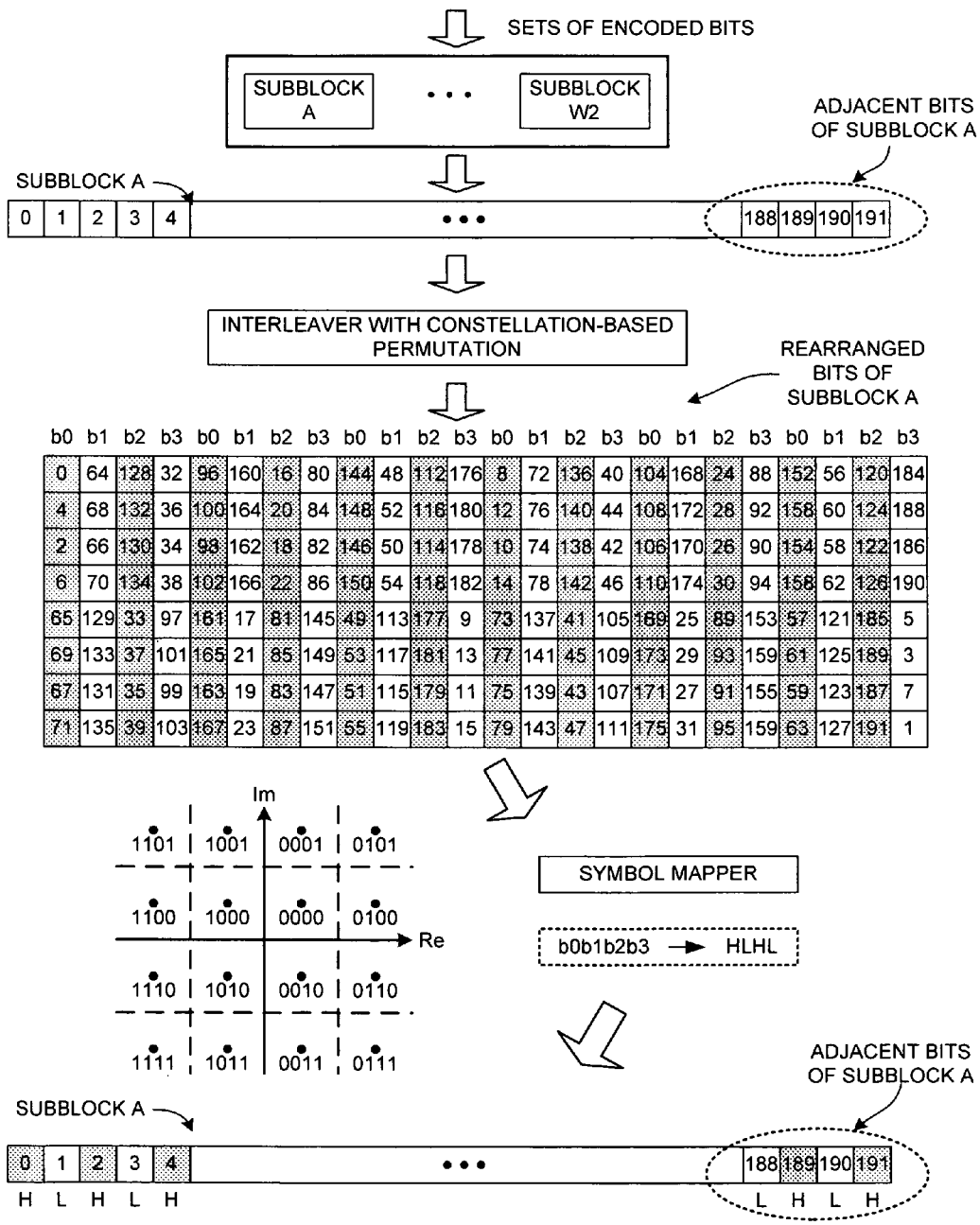
FIG. 10 illustrates how constellation diversity is achieved within each subblock through a constellation-based permutation module.

FIG. 10 illustrates how constellation diversity is achieved within each subblock through constellation-based permutation module 95 of FIG. 9A. FIG. 10 comprises simplified diagrams of subblock A before and after subblock interleaving and scrambling. First, a plurality of sets of encoded bits 101 is distributed into multiple subblocks, and each subblock includes a plurality of adjacent bits such as "188, 189, 190, 191" of subblock A. Each subblock is then interleaved and scrambled into rearranged bits 106 by channel interleaver 91. Rearranged bits 106 are mapped onto modulation symbols by symbol mapper 45. In the example of FIG. 10, 16QAM modulation scheme is used. Using 16QAM, each modulation symbol carries four bits b0b1b2b3; with b0 and b2 have high bit reliability H, and b1 and b3 have low bit reliability L.

Figure 2:
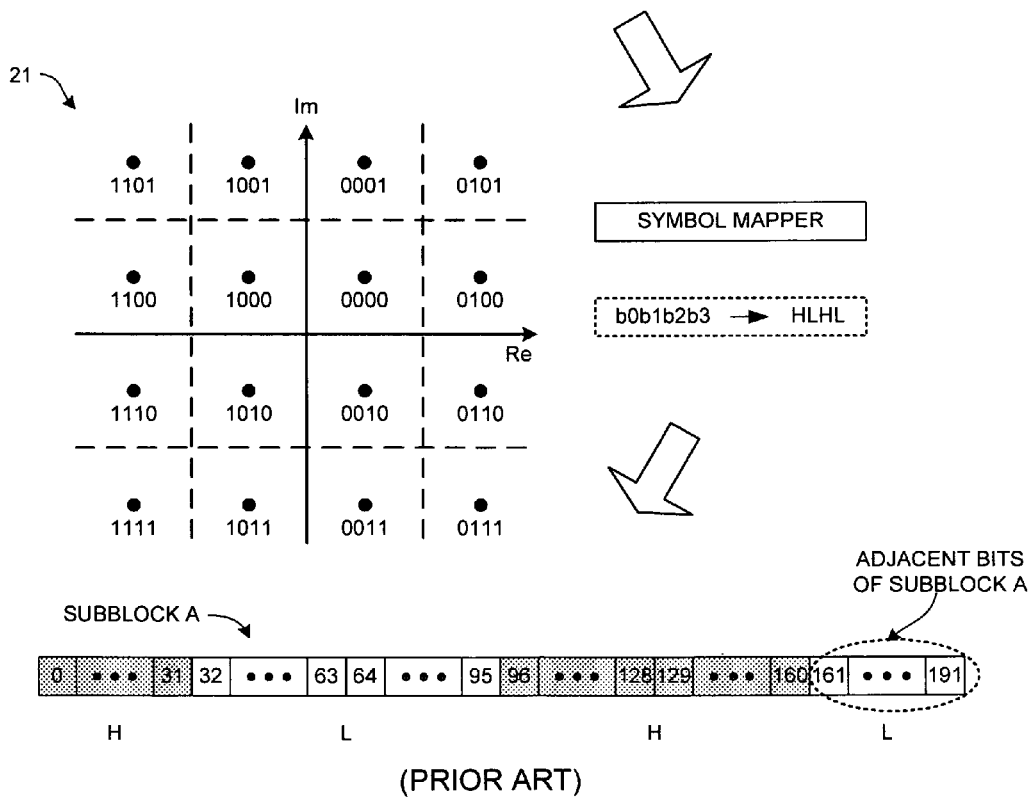
FIG. 2 (Prior Art) illustrates a subblock diagram after subblock interleaving and a 16QAM constellation map.

As illustrated in the background section with respect to FIG. 2, using IEEE 802.16e channel interleaver 11, the adjacent bits of subblock A (i.e., "188, 189, 190, 191") are mapped onto the same bit reliability (i.e., "L") because of the adopted subblock interleaving scheme, a problem being referred to as intra-block continuity. In the example of FIG. 10, however, because the subblock is partitioned into two units, and only one of the two units is selected for scrambling, the adjacent bits of subblock A (i.e., "188, 189, 190, 191") are thus prevented to be mapped onto the same level of bit reliability. In fact, the adjacent bits of subblock A are mapped onto different levels of bit reliability (i.e., "LHLH"). Intra-block continuity is thus avoided to improve decoder performance. In addition, inter-block continuity is also avoided because different units in different subblocks are selected for scrambling.

Figure 11:
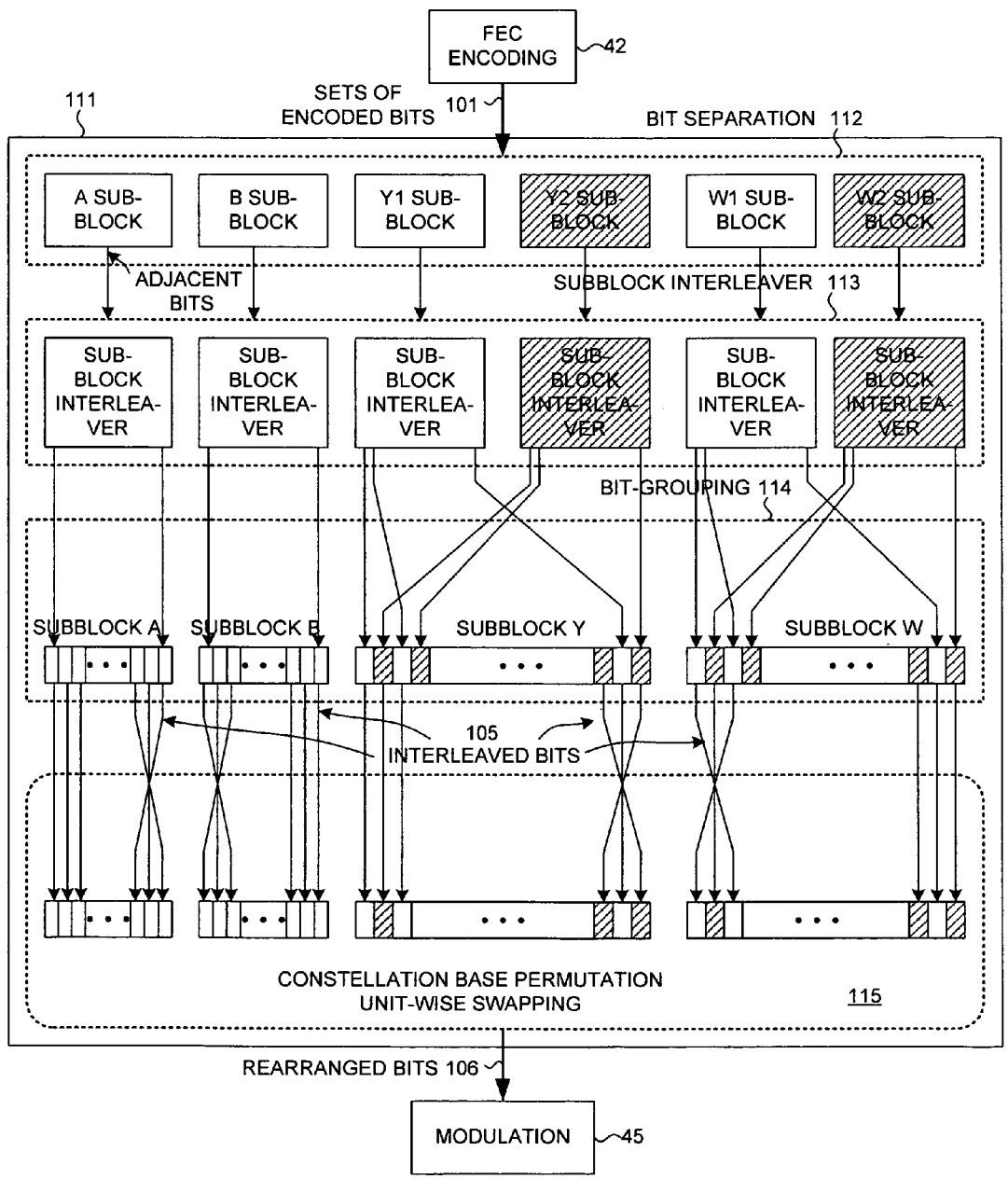
FIG. 11 is a block diagram that illustrates a fifth embodiment of a channel interleaver of FIG. 4.

FIG. 11 is a block diagram of a channel interleaver 111 that illustrates a fifth embodiment of channel interleaver 43 of FIG. 4. Channel interleaver 111 comprises a bit separation module 112, a subblock interleaver 113, a bit-grouping module 114, and a constellation-based permutation module 115. Channel interleaver 111 is very similar as compared to channel interleaver 91 of FIG. 9A. However, constellation-based permutation module 115 performs unit-wise scrambling by swapping instead of shifting. First, each subblock is partitioned into a number of units. Next, a number of units are selected. The selected number of units is determined based on modulation order, FEC block size (Nep), and the position of the selected block. Finally, each selected unit is swapped.

Swapping involves swapping the i-th bit and the (N−i+1)-th bit of a selected unit having N bits, wherein i is a running index from one to N/2.

In the example of FIG. 11, subblocks A and B are partitioned into N/3 units, and subblocks Y and W are partitioned into 2*N/3 units, where each unit contains three bits. For subblocks A and Y, the first N/6 and N/3 units are selected, and the first and the last bit in each selected unit are swapped. For subblocks B and W, the last N/6 and N/3 units are selected, and the first and the last bit in each selected unit are swapped. By partitioning subblocks into units and swapping a selected number of units, constellation diversity is achieved for each set of encoded bits generated from the FEC encoder and for the adjacent bits within each subblock.

Simulation Result

Figure 12A:
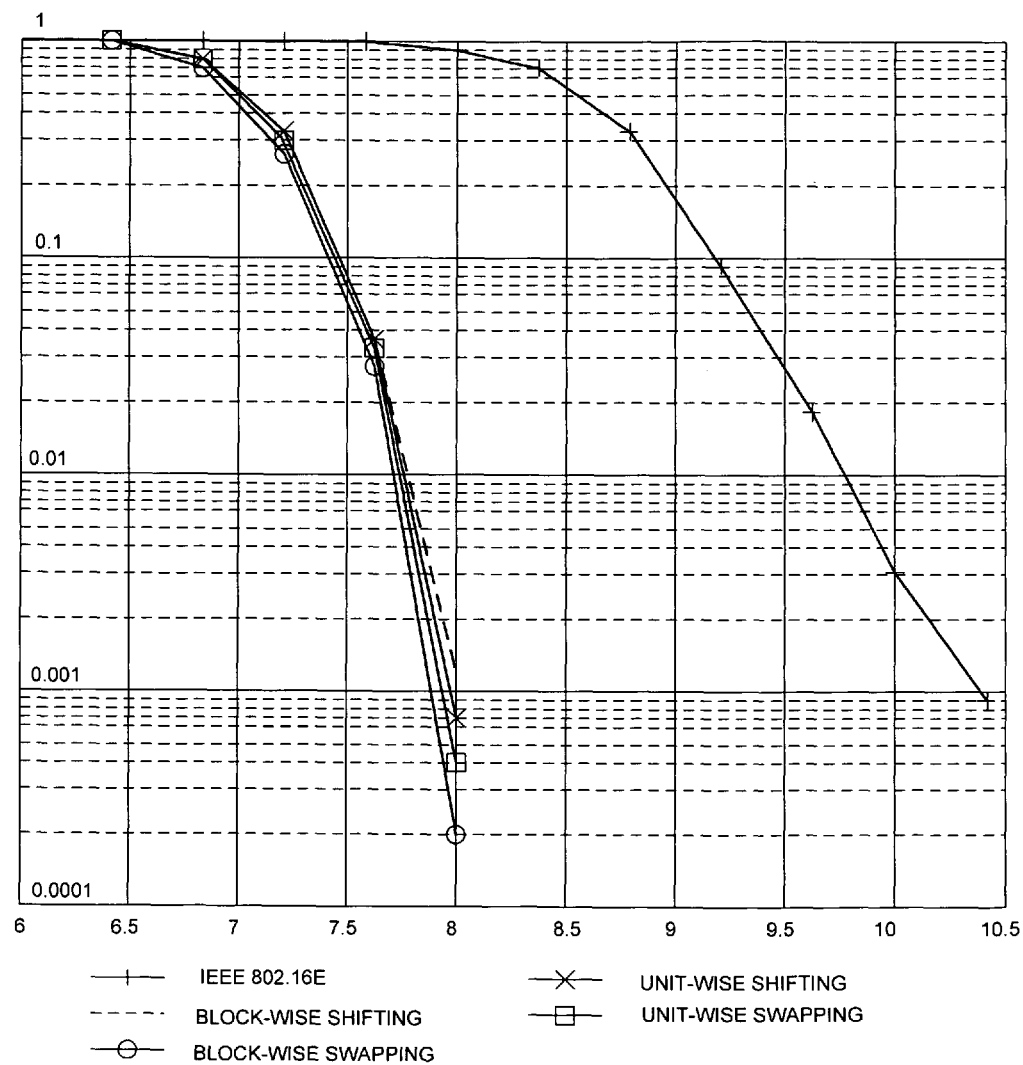
FIGS. 12A and 12B are diagrams of simulation result for channel interleaver performance.
Figure 12B:
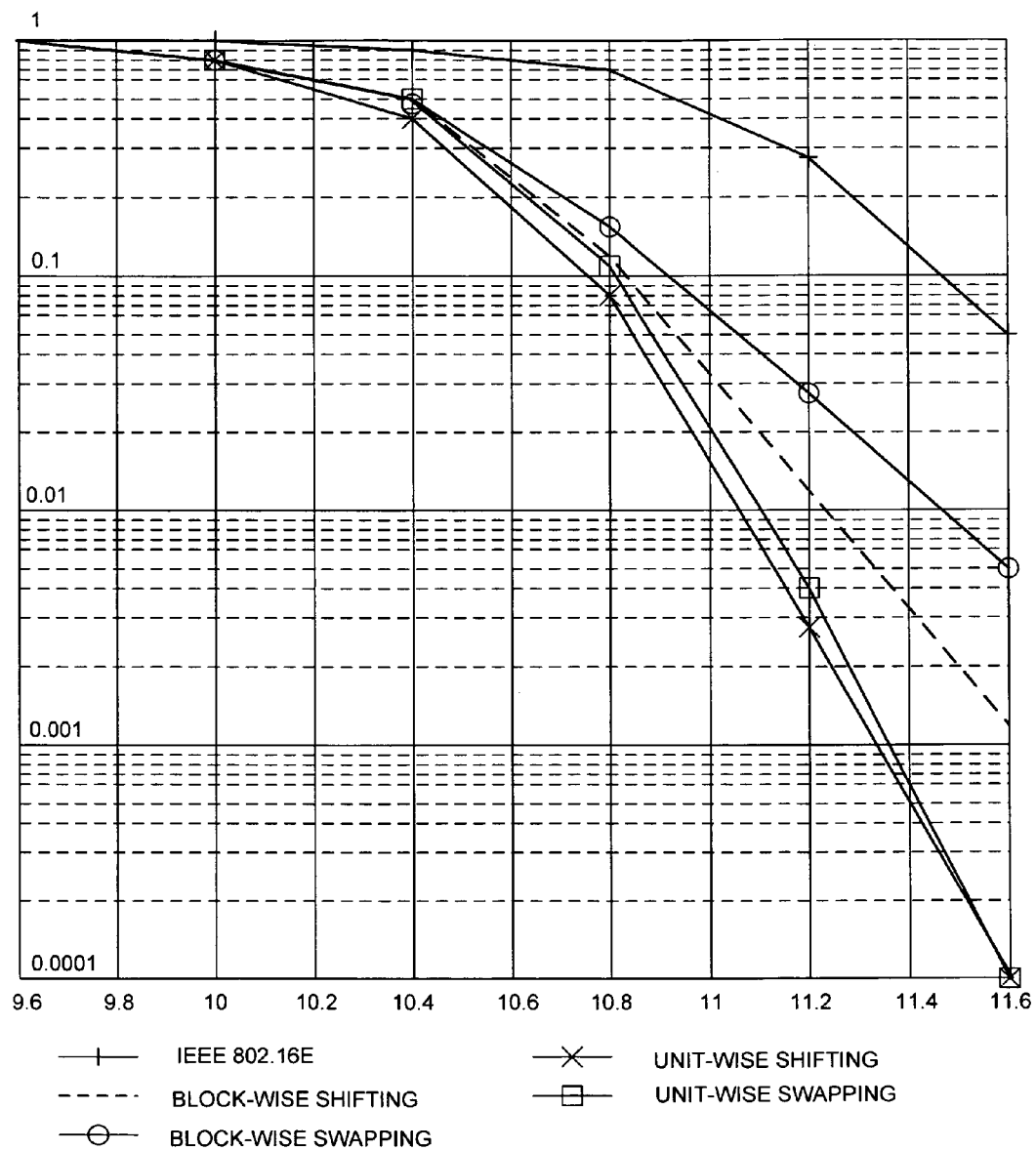

FIGS. 12A and 12B are diagrams of simulation result for channel interleaver performance under different interleaving options. In FIG. 12A, FEC block size Nep is 960, modulation is 64QAM, and code rate is 1/3. In FIG. 12B, FEC block size Nep is 960, modulation is 64QAM, and code rate is 1/2. As illustrated by both FIGS. 12A and 12B, all proposed channel interleavers outperform the original IEEE 802.16e channel interleaver by about 2 dB (target BLER is 0.01). The performance of channel interleavers with block-wise scrambling scheme is similar to the channel interleavers with unit-wise scrambling scheme when code rate is 1/3. When code rate is 1/2, however, the performance of channel interleavers with unit-wise scrambling scheme outperforms channel interleavers with block-wise scrambling scheme by about 0.1~0.3 dB. Unit-wise scrambling scheme provides increased performance because it can gain constellation diversity within each subblock at the cost of increased complexity.

Other Embodiments

Figure 13A:
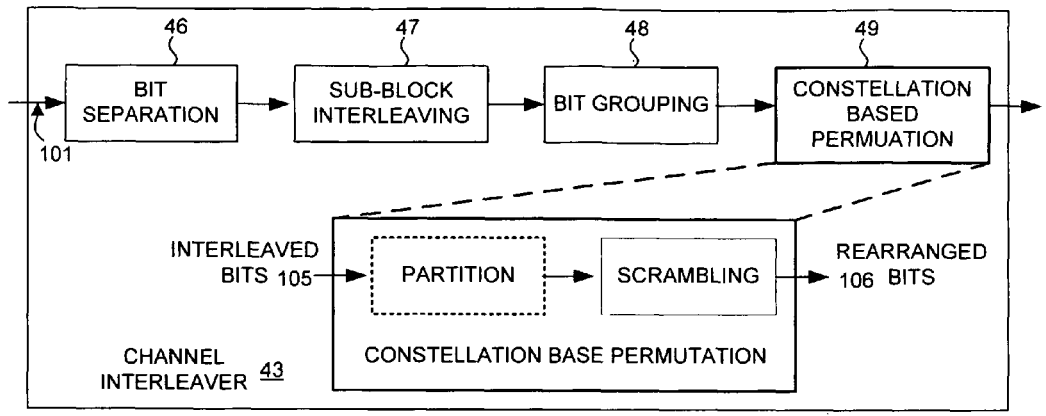
FIGS. 13A, 13B and 13C illustrate different embodiments of a channel interleaver in accordance with one novel aspect.
Figure 13B:
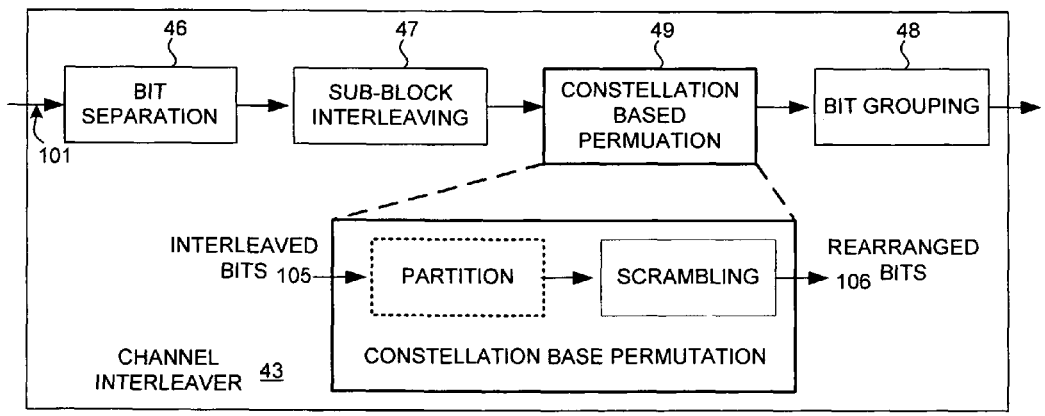
Figure 13C:
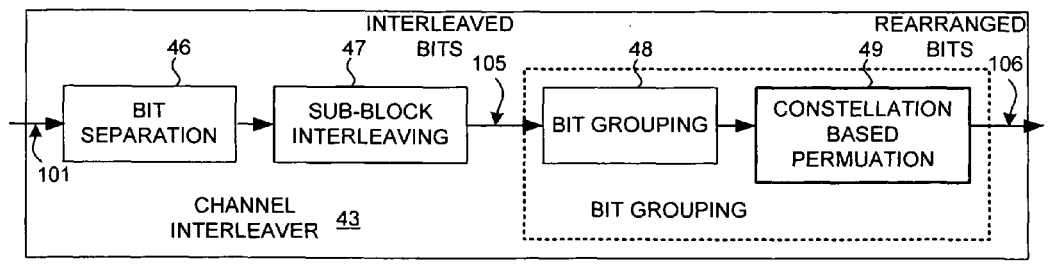

FIGS. 13A, 13B and 13C are diagrams that illustrate other different embodiments of channel interleaver 43 of FIG. 4. In the example of FIG. 13A, bit separation module 46 receives a plurality of sets of encoded bits 101 from FEC encoder 42 and distributes the encoded bits into several information subblocks and parity subblocks. Subblock interleaver 47 interleaves all subblocks independently. Bit-grouping module 48 multiplexes the interleaved subblocks and regroups them into subblocks. Constellation-based permutation module receives interleaved bits 105 from bit-grouping module 48 and scrambles the interleaved bits into rearranged bits 106. In the example of FIG. 13B, constellation-based permutation module 49 receives interleaved bits 105 from subblock interleaver 47 and scrambles the interleaved bits into rearranged bits 106. Bit-grouping module 48 then multiplexes the rearranged bits 106 and regroups them into subblocks. In the example of FIG. 13C, bit-grouping module 48 and constellation-based permutation module 49 are implemented together as a single bit-grouping module.

Although the present invention has been described in connection with certain specific embodiments for instructional purposes, the present invention is not limited thereto. For example, FEC encoder 42 of FIG. 4 may not be a CTC encoder but some other type of encoder. In addition, symbol mapper 45 of FIG. 4 may not use 16QAM or 64QAM to map the rearrange bits onto modulation symbols. Accordingly, various modifications, adaptations, and combinations of various features of the described embodiments can be practiced without departing from the scope of the invention as set forth in the claims.

What is claimed is:

1. A method for channel interleaving, comprising:
    distributing a plurality of sets of encoded bits generated by a forward error correction (FEC) encoder into a first set of multiple subblocks, wherein each subblock comprises a plurality of adjacent bits;
    interleaving each of the first set of multiple subblocks and outputting a plurality of interleaved bits; and
    rearranging the interleaved bits and outputting a plurality of rearranged bits, wherein the rearranged bits are supplied to a symbol mapper such that the plurality of adjacent bits within each subblock is prevented to be mapped onto the same level of bit reliability of a modulation symbol to achieve constellation diversity.

2. The method of claim 1, wherein a plurality of consecutively encoded bits in the same set of the encoded bits is also prevented to be mapped onto the same level of bit reliability of the modulation symbol.

3. The method of claim 1, wherein the rearranging further comprises:
    multiplexing the interleaved bits and grouping the multiplexed interleaved bits into a second set of multiple subblocks;
    partitioning each of the second set of multiple subblocks into multiple units;
    selecting a number of units from the multiple units for each of the second set of multiple subblocks; and
    circularly shifting a number of bits on each of the selected units for each of the second set of multiple subblocks.

4. The method of claim 1, wherein the rearranging further comprises:
    partitioning the interleaved bits into multiple units;
    selecting a number of units from the multiple units; and
    circularly shifting a number of bits on each of the selected units for each of the first set of multiple subblocks.

5. The method of claim 3, wherein the number of units selected is determined based on modulation order, FEC block size, and position of the selected subblock.

6. The method of claim 3, wherein the number of bits shifted is determined based on modulation order, FEC block size, and position of the selected unit.

7. The method of claim 3, wherein 16QAM modulation scheme is used, wherein each of the second set of multiple subblocks is partitioned into two units, and wherein one unit out of the two units of each subblock is selected to be shifted by one bit.

8. The method of claim 3, wherein 64QAM modulation scheme is used, wherein each of the second set of multiple subblocks is partitioned into three units, and wherein two units out of the three units of each subblock are selected, and wherein one unit is shifted by one bit and the other is shifted by two bits.

9. The method of claim 1, wherein the rearranging further comprises:
    multiplexing the interleaved bits and grouping the multiplexed interleaved bits into a second set of multiple subblocks;
    partitioning each of the second set of multiple subblocks into multiple units;
    selecting a number of units out of the multiple units; and
    performing unit-wise swapping on each of the selected units for each of the second set of multiple subblocks.

10. The method of claim 1, wherein the rearranging further comprises:
    partitioning each of the first set of multiple subblocks into multiple units;
    selecting a number of units out of the multiple units; and
    performing unit-wise swapping on each of the selected units for each of the first set of multiple subblocks.

11. The method of claim 9, wherein the number of units selected in (e) is determined based on modulation order, FEC block size, and position of the selected subblock.

12. The method of claim 9, wherein the unit-wise swapping in (f) involves swapping the i-th bit and the (N−i+1)-th bit of a selected unit having N bits, wherein i is a running index from one to N/2.

13. The method of claim 9, wherein 16QAM modulation scheme is used, wherein each of the second set of multiple subblocks having N bits is partitioned into N/2 units, wherein each unit comprises three bits, and wherein the first bit and the last bit in each selected unit is swapped.

14. The method of claim 9, wherein 64QAM modulation scheme is used, wherein each of the second set of multiple subblocks having N bits is partitioned into N/3 units, wherein each unit comprises three bits, and wherein the first bit and the last bit in each selected unit is swapped.

15. A channel interleaver, comprising:
a bit separator that distributes a plurality of sets of encoded bits generated by a forward error correction (FEC) encoder into a first set of multiple subblocks, wherein each subblock comprises a plurality of adjacent bits;
a subblock interleaver that interleaves each of the first set of multiple subblocks and outputs a plurality of interleaved bits; and
a constellation-based permutation module that rearranges the interleaved bits and outputs a plurality of rearranged bits, wherein the rearranged bits are supplied to a symbol mapper such that the plurality of adjacent bits within each subblock is prevented to be mapped onto the same level of bit reliability of a modulation symbol to achieve constellation diversity.

16. The interleaver of claim 15, wherein a plurality of consecutively encoded bits in the same set of the encoded bits is also prevented to be mapped onto the same level of bit reliability of the modulation symbol.

17. The interleaver of claim 15, wherein the constellation-based permutation module partitions each of the first set of multiple subblocks into multiple units, selects a number of units from the multiple units, and then circularly shifts a number of bits on each of the selected units for each of the first set of multiple subblocks.

18. The interleaver of claim 15, further comprising:
a bit multiplexer for multiplexing the interleaved bits and grouping the multiplexed interleaved bits into a second set of multiple subblocks, wherein the constellation-based permutation module partitions each of the second set of multiple subblocks into multiple units, selects a number of units from the multiple units, and then circularly shifts a number of bits on each of the selected units for each of the second set of multiple subblocks.

19. The interleaver of claim 18, wherein the number of units selected is determined based on modulation order, FEC block size, and position of the selected subblock.

20. The interleaver of claim 18, wherein the number of bits shifted is determined based on modulation order, FEC block size, and position of the selected unit.

21. The interleaver of claim 18, wherein 16QAM modulation scheme is used, wherein each subblock is partitioned into two units, and wherein one unit out of the two units of each of the second set of multiple subblocks is selected to be shifted by one bit.

22. The interleaver of claim 18, wherein 64QAM modulation scheme is used, wherein each subblock is partitioned into three units, and wherein two units out of the three units of each of the second set of multiple subblocks are selected, and wherein one unit is shifted by one bit and the other is shifted by two bits.

23. The interleaver of claim 15, wherein the constellation-based permutation module partitions each subblock of the first multiple subblocks into multiple units, selects a number of units from the multiple units, and then performs unit-wise swapping on each of the selected units for each of the first set of multiple subblocks.

24. The interleaver of claim 15, further comprising:
a bit-grouping module for multiplexing the interleaved bits and grouping the multiplexed interleaved bits into a second set of multiple subblocks, wherein the constellation-based permutation module partitions each of the second set of multiple subblocks into multiple units, selects a number of units from the multiple units, and then performs unit-wise swapping on each of the selected units for each of the second set of multiple subblocks.

25. The interleaver of claim 24, wherein the number of units selected is determined based on modulation order, FEC block size, and position of the selected subblock.

26. The interleaver of claim 24, wherein the unit-wise swapping involves swapping the i-th bit and the (N−i+1)-th bit of a selected unit having N bits, wherein i is a running index from one to N/2.

27. The interleaver of claim 24, wherein 64QAM modulation scheme is used, wherein each subblock having N bits is partitioned into N/3 units, wherein each unit comprises three bits, and wherein the first bit and the last bit in each selected unit is swapped.

28. An apparatus, comprising:
an encoder that performs forward error correction (FEC) encoding and outputs a plurality of sets of encoded bits, wherein each set of the encoded bits are distributed into a first set of multiple subblocks, and wherein each subblock comprises a plurality of adjacent bits; and
an interleaver for interleaving each of the subblocks and outputting a plurality of interleaved bits to reduce burst channel error length, wherein the interleaver is also for rearranging the interleaved bits and outputting a plurality of rearranged bits, wherein the rearranged bits are supplied to a symbol mapper such that the plurality of adjacent bits within each subblock is prevented to be mapped onto the same level of bit reliability of a modulation symbol to achieve constellation diversity.

29. The apparatus of claim 28, wherein a plurality of consecutively encoded bits in the same set of the encoded bits is also prevented to be mapped onto the same level of bit reliability of the modulation symbol.

30. The apparatus of claim 28, wherein the encoder comprises a convolutional turbo code (CTC) encoder.

31. The apparatus of claim 28, wherein the interleaver comprises a constellation-based permutation module that partitions each subblock of the first set of multiple subblocks into multiple units, selects one or more units, and circularly shifts a number of bits on each of the selected units for each subblock of the first set of multiple subblocks.

32. The apparatus of claim 28, wherein the interleaver comprises a bit-grouping module for multiplexing the interleaved bits and grouping the multiplexed interleaved bits into a second set of multiple subblocks and a constellation-based permutation module that partitions each subblock of the second set of multiple subblocks into multiple units, selects one or more units, and circularly shifts a number of bits on each of the selected units for each subblock of the second set of multiple subblocks.

33. The apparatus of claim 28, wherein the interleaver comprises a constellation-based permutation module that partitions each subblock of the first set of multiple subblocks into multiple units, selects one or more units, and performs unit-wise swapping on each of the selected units for each subblock of the first set of multiple subblocks.

34. The apparatus of claim 28, wherein the interleaver comprises a bit-grouping module for multiplexing the interleaved bits and grouping the multiplexed interleaved bits into a second set of multiple subblocks and a constellation-based permutation module that partitions each subblock of the second set of multiple subblocks into multiple units, selects one or more units, and performs unit-wise swapping on each of the selected units for each subblock of the second set of multiple subblocks.

* * * * *